(12) United States Patent
Higashikawa

(10) Patent No.: US 10,946,610 B2
(45) Date of Patent: *Mar. 16, 2021

(54) DECORATIVE MATERIAL

(71) Applicant: TOPPAN PRINTING CO., LTD., Tokyo (JP)

(72) Inventor: Eiichi Higashikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,602

(22) Filed: Nov. 19, 2018

(65) Prior Publication Data

US 2019/0085507 A1    Mar. 21, 2019

Related U.S. Application Data

(63) Continuation of application No. PCT/JP2017/019815, filed on May 26, 2017.

(30) Foreign Application Priority Data

May 26, 2016  (JP) .............................. JP2016-105260

(51) Int. Cl.
*B32B 3/10* (2006.01)
*B32B 27/20* (2006.01)
(Continued)

(52) U.S. Cl.
CPC ................ *B32B 3/10* (2013.01); *B32B 27/00* (2013.01); *B32B 27/20* (2013.01); *B32B 3/263* (2013.01);
(Continued)

(58) Field of Classification Search
CPC ............ C09D 11/02; C09C 1/28; C09C 3/063
(Continued)

(56) References Cited

U.S. PATENT DOCUMENTS 10,723,904 B2 *   7/2020  Higashikawa ........... B32B 27/18
2001/0046594 A1 * 11/2001  Takemoto ................. B44C 1/10
                                                       428/203
(Continued)

FOREIGN PATENT DOCUMENTS

EP          2067616 A1       6/2009
EP        2 298 526 A        3/2011
(Continued)

OTHER PUBLICATIONS

International Search Report regarding PCT/JP2017/019815, dated Jul. 11, 2017, 2 pps.
(Continued)

*Primary Examiner* — Betelhem Shewareged
(74) *Attorney, Agent, or Firm* — Foley & Lardner LLP

(57) ABSTRACT

In a decorative material, a matting agent is added to, of a first gloss-adjusting layer and a second gloss-adjusting layer, one with lower gloss, where the matting agent has a particle diameter of 1.0 times or more the thickness of the gloss-adjusting layer with lower gloss. Accordingly, sufficient unevenness can be imparted to the surface of the gloss-adjusting layer; thus, glossiness does not increase in oblique observation, and low gloss can be maintained. Therefore, it is possible to provide a decorative material having a feeling of unevenness obtained by the difference in gloss that hardly changes even when observed obliquely.

5 Claims, 1 Drawing Sheet

(51) Int. Cl.
  *B32B 27/00* (2006.01)
  *B32B 3/26* (2006.01)
  *B32B 27/40* (2006.01)
  *B32B 33/00* (2006.01)

(52) U.S. Cl.
  CPC ............... *B32B 27/40* (2013.01); *B32B 33/00* (2013.01); *Y10T 428/24876* (2015.01)

(58) Field of Classification Search
  USPC ...................................................... 428/195.1
  See application file for complete search history.

(56) References Cited

U.S. PATENT DOCUMENTS

| | | | |
|---|---|---|---|
| 2011/0143128 A1 | 6/2011 | Saitou et al. | |
| 2014/0065384 A1 | 3/2014 | Saitou et al. | |
| 2019/0085507 A1* | 3/2019 | Higashikawa | B32B 27/00 |

FOREIGN PATENT DOCUMENTS

| | | | | |
|---|---|---|---|---|
| JP | H08-300595 A | 11/1996 | | |
| JP | 3629964 B | 2/2000 | | |
| JP | 2001-138470 A | 5/2001 | | |
| JP | 2001-315286 A | 11/2001 | | |
| JP | 2001315286 A | * 11/2001 | ............... | B05D 5/00 |
| JP | 2005-042373 A | 2/2005 | | |
| JP | 2008-087269 A | 4/2008 | | |
| JP | 2014-069446 A | 4/2014 | | |
| JP | 2014-188744 A | 10/2014 | | |
| JP | 2015-182353 A | 10/2015 | | |
| JP | 2017-065261 A | 4/2017 | | |

OTHER PUBLICATIONS

Extended European Search Report dated Nov. 12, 2019 for corresponding Application No. 17802947.6.

* cited by examiner

DECORATIVE MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/019815, filed on May 26, 2017, which is based upon and claims the benefit of priority to Japanese Patent Application No. 2016-105260, filed on May 26, 2016, the disclosures of which are all hereby incorporated herein by reference in their entireties.

TECHNICAL FIELD

The present invention relates to a decorative material for use in interior and exterior finishes of buildings, and surface decoration of fittings, furniture, etc. More specifically, the present invention relates to a decorative material that three-dimensionally expresses unevenness due to a difference in surface gloss.

BACKGROUND ART

Conventionally, desired design patterns, such as wood grain patterns and grain patterns, have generally been applied to decorative materials for use in, for example, interior and exterior finishes of buildings, and surface decoration of fittings, furniture, etc. Moreover, decorative materials that not only two-dimensionally express design patterns, such as wood grain patterns and grain patterns, but also three-dimensionally to express the feeling of unevenness of the surface of natural wood materials or stone materials, have also been widely used mainly for applications for which a high-grade feeling is desired.

As a method for expressing a feeling of three-dimensional unevenness together with a two-dimensional design pattern on the surface of decorative materials, various methods have been conventionally devised, and separately used depending on the purpose. In particular, there is a method for visually expressing three-dimensional unevenness by taking advantage of optical illusions by changing the surface gloss state (specifically glossiness) of portions to be expressed as recesses or projections, rather than actually forming unevenness on the surface of the decorative material. According to this method, even if there is actually no unevenness, the human eye recognizes portions with higher gloss as projections, and portions with lower gloss as recesses.

Specifically, for example, a transparent or translucent synthetic coating material layer with low gloss is formed on the entire print surface of a substrate on which suitable patterns, including a recessed pattern, are printed. Then, a transparent or translucent synthetic coating material layer with high gloss is formed on portions of the surface of the formed synthetic coating material layer other than portions corresponding to the recessed pattern. Of course, a decorative material in which the unevenness relationship is reversed can be obtained by reversing the height relationship of gloss.

This method does not require special chemicals etc., and can easily impart a feeling of three-dimensional unevenness to any substrates only by preparing two types of coating materials with different glosses. In addition, synthetic coating material layers with different glosses can be formed by a known printing method, such as a gravure printing method, after the formation of a design pattern (a pattern ink layer); thus, special facilities are not required, production efficiency is high, and synchronization with the design pattern is easy. Moreover, the thickness of the synthetic coating material layer is much thinner than the height difference of unevenness to be expressed; thus, the amount of resin used can be reduced, there is an advantage in terms of flexibility, and a decorative material having excellent bending processability can be easily realized. There is another advantage that contaminants do not remain in recesses because there is no large unevenness on the surface of the decorative material.

In consideration of these many advantages, decorative materials using this method have already been frequently used; however, in terms of high-grade feeling, there are no methods better than methods for actually forming unevenness. The reason for this is considered to be as follows. For example, a mechanical embossing method can faithfully reproduce unevenness, such as natural wood vessels, including the cross-sectional shape of the vessels etc. In contrast, in this method using two types of coating materials with different glosses, the surface has two variations of glosses; thus, two variations of unevenness are expressed. Accordingly, there is a problem that it is difficult to express unevenness having an inclined portion with continuously varying depth (height), such as natural wood vessels.

In light of the above, there have recently been proposals for decorative materials that can express unevenness having an inclined portion, such as natural wood vessels, by providing a synthetic coating material layer that expresses unevenness having an inclined portion with continuously varying depth (hereinafter also referred to as a "gloss-adjusting layer") (see, for example, PTL 1).

CITATION LIST

Patent Literature

PTL 1: JP 3629964 B

SUMMARY OF THE INVENTION

Technical Problem

Here, as a general method for adjusting the gloss of the gloss-adjusting layer, a gloss-adjusting agent (a matting agent) is added to a transparent resin, which is used as a binder. Fine particles of an inorganic material or organic material are mainly used as gloss-adjusting agents. In particular, inorganic material fine particles (particularly silica fine particles) have high matting ability and are widely used. Due to the addition of a gloss-adjusting agent, the gloss-adjusting agent imparts unevenness to the surface of the gloss-adjusting layer, and light is scattered on the uneven surface, thereby obtaining a matting effect. Desired gloss can be freely obtained by controlling the type and amount of such a gloss-adjusting agent.

However, unevenness imparted by a gloss-adjusting agent is smaller than the thickness of the gloss-adjusting layer, and much smaller than unevenness imparted by a mechanical embossing method. Therefore, although a sufficient feeling of unevenness due to a difference in gloss is obtained when the decorative material surface is observed from the front, the glossiness of a portion with lower gloss increases when the decorative material surface is observed obliquely. This causes a problem that the feeling of unevenness obtained by a difference in gloss is reduced. When decorative materials are actually used for interior and exterior finishes of buildings, or for fittings, furniture, etc., users are found to observe the decorative material surface from various angles. Accordingly, there is a problem that the feeling of unevenness has angular dependence as described above and this thereby significantly impairs the high-grade feeling of the decorative materials.

In order to solve the above problems, an object of the present invention is to provide a decorative material having a feeling of unevenness obtained by a difference in gloss that hardly changes even when observed obliquely.

Solution to Problem

As a result of extensive research, the present inventors found that when the thickness of a gloss-adjusting layer with lower gloss and the particle diameter of a matting agent to be added were set within an optimal range, the gloss increase of the gloss-adjusting layer when observed obliquely could be suppressed, and the feeling of unevenness due to the difference in gloss was not impaired even when observed from various angles.

In order to achieve the above object, the decorative material of one embodiment of the present invention comprises a first gloss-adjusting layer provided on a substrate, and a second gloss-adjusting layer partially provided on the first gloss-adjusting layer, and having gloss that is different from that of the first gloss-adjusting layer; characterized in that a matting agent is added to, of the first gloss-adjusting layer and the second gloss-adjusting layer (i.e., either to first gloss-adjusting layer or to the second gloss-adjusting layer), one with lower gloss, where the matting agent has a particle diameter of 1.0 times or more the thickness of the gloss-adjusting layer having lower gloss.

Advantageous Effects of the Invention

According to the decorative material of one embodiment of the present invention, when the layer thickness of a gloss-adjusting layer with lower gloss and the particle diameter of a matting agent to be added are set within the optimal range, the gloss increase of the gloss-adjusting layer when observed obliquely can be suppressed, and it is possible to provide a decorative material having a feeling of unevenness obtained by the difference in gloss that hardly changes even when observed obliquely.

DESCRIPTION OF REPRESENTATIVE EMBODIMENTS

Figure 1:
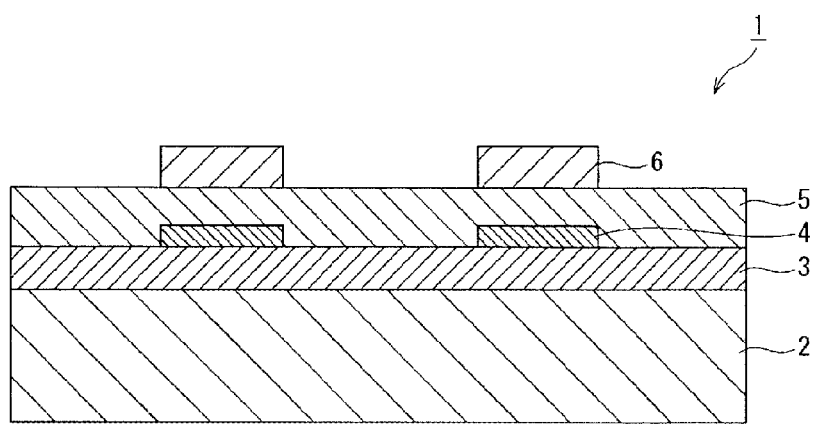
FIG. 1 is a cross-sectional view showing a decorative material.

A decorative material 1 according to an embodiment of the present invention is described with reference to the drawings. With reference to the drawings, an embodiment of the present invention will be described in detail. It is to be understood that the present invention is not limited to the following embodiment, which is intended to be representative of the present invention. The representative embodiment described below is merely an example of the present invention, and the design thereof could be appropriately changed by one skilled in the art. Incidentally, unless there is a reason for the sake of convenience, the same reference signs will be used for identical components, and redundant explanations will be omitted. It will be noted that in the drawings, like or corresponding parts are designated by like reference numerals and redundant illustrations therefor are omitted. The dimensional ratios in the drawings should not be construed as limited to those ratios shown therein. Here, the drawings are schematic, and the relationship between thickness and plane size, the ratio of the thickness of each layer, etc., are different from actual ones. The technical idea of the present invention can be modified in various ways within the technical scope specified by the claims (Structure)

As shown in FIG. 1, the decorative material 1 of the present embodiment comprises a first gloss-adjusting layer 5 provided on a substrate 2, and a second gloss-adjusting layer 6 partially provided on the first gloss-adjusting layer 5, and having gloss different from that of the first gloss-adjusting layer 5. It is important that a matting agent be added to, of these first and second gloss-adjusting layers 5 and 6, the one with lower gloss, where the matting agent has a particle diameter of 1.0 times or more, and preferably 1.1 times or more, the thickness of the gloss-adjusting layer having lower gloss. Because sufficient unevenness can be thereby imparted to the surface of the gloss-adjusting layer, glossiness does not increase in oblique observation, and low gloss can be maintained.

Other layers, such as a base ink layer 3, a pattern ink layer 4, and a transparent resin layer (not shown), may be disposed between the substrate 2 and the first gloss-adjusting layers 5, as described later. The base ink layer 3 may be formed, for example, by application of ink over an entire surface of the substrate 2.

The layer thickness mentioned herein refers to the thickness of a resin part that fills between the matting agents when the cross section of the gloss-adjusting layer with lower gloss is observed. In the present embodiment, the particle diameter of the matting agent is 1.1 times or more the layer thickness; thus, the matting agent is not buried in the gloss-adjusting layer, and is partially exposed from the surface. Therefore, the layer thickness can be determined by measuring the height of the several resin parts between the matting agents, and averaging the obtained values. Regarding the particle diameter, when the particle shape is not spherical, the cross-sectional shape of the particles may be regarded as elliptical, and the average of the major axis and minor axis may be used as the particle diameter. That is, the particle diameter in the present embodiment refers to an average particle diameter when the particles are assumed to have a circular or elliptical cross-sectional shape.

Although the present embodiment describes a case in which the particle diameter of the matting agent is 1.1 times or more the layer thickness, the present embodiment is not limited thereto. For example, even when the particle diameter of the matting agent is 1.0 times the layer thickness, the matting agent is not buried in the gloss-adjusting layer, and is partially exposed from the surface. This is because some matting agents, described later, have surfaces with low "wettability" for the resin that forms the gloss-adjusting layer. In that case, the resin is repelled on part of the surface of the matting agent during the formation of the gloss-adjusting layer.

Moreover, the upper limit of the particle diameter of the matting agent is preferably 3.0 times the thickness of the gloss-adjusting layer with lower gloss, considering that a larger particle diameter tends to cause removal from the resin component, so that abrasion resistance and scratch resistance required for decorative materials are deteriorated; and that a larger particle diameter increases surface unevenness, so that contaminant component-wiping properties are worsened to thereby cause deterioration of contamination resistance.

Regarding the relationship between the layer thickness and the particle diameter of the matting agent, it is important that the particle diameter of the matting agent be 1.0 times or more, and preferably 1.1 times or more, the layer thickness; however, the specific size may be any numerical value. For example, when the layer thickness is 5 μm, the particle diameter of the matting agent may be 5.0 μm or more, and more preferably 5.5 μm or more.

As the matting agent, a commercially available known matting agent can be used. For example, fine particles of an inorganic material, such as silica, glass, alumina, calcium carbonate, barium sulfate, or acrylic, can be used. Because the first and second gloss-adjusting layers 5 and 6 are required to have high transparency, it is particularly preferable to use fine particles of silica, glass, or acrylic, which have high transparency. In particular, among silica fine particles, a matting agent with a low bulk density in which fine primary particles undergo secondary aggregation has a higher matting effect relative to the addition amount, than solid spherical particles. Thus, a gloss-adjusting layer with lower gloss can be formed using such a matting agent. Accordingly, the difference in gloss between the first gloss-adjusting layer 5 and the second gloss-adjusting layer 6 can be increased, and the feeling of unevenness to be obtained can be enhanced. An excellent design expression of greater depth can be thereby achieved.

The particle diameter of the matting agent can be any numerical value, as described above; however, when a known matting agent is used, the particle diameter thereof is preferably 2 μm or more and 15 μm or less. The particle diameter is more preferably 4 μm or more and 12 μm or less. Because a matting agent having a particle diameter of less than 2 μm has a low matting effect, a feeling of unevenness, which is a feature of the present embodiment, cannot be sufficiently obtained. Moreover, a matting agent having a particle diameter of larger than 15 μm leads to strong light scattering, which causes cloudiness of the first and second gloss-adjusting layers 5 and 6, increases visual particle recognition, and impairs the feeling of unevenness, this unevenness being a feature of the present embodiment.

Examples of the resin part (resin composition) that constitutes the first and second gloss-adjusting layers 5 and 6 include polyurethane-based resins, acrylic silicon-based resins, fluorine-based resins, epoxy-based resins, vinyl-based resins, polyester-based resins, melamine-based resins, amino-alkyd-based resins, urea-based resins, and the like. Moreover, the resin composition may be in the form of an aqueous solution, an emulsion, a solvent, or the like, and the form of the resin composition is not limited. Furthermore, as the method for curing the resin composition, for example, a one-component curing agent or a two-component curing agent, or an ultraviolet curing method, can be used.

In the present embodiment, the resin composition is particularly preferably a urethane-based resin using isocyanate in terms of workability, price, cohesive force of the resin itself, etc. Usable examples of the isocyanate include curing agents, such as adduct products, biuret products, and isocyanurate products, which are derivatives of tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), methylhexane diisocyanate (HTDI), bis(isocyanatomethyl)cyclohexane (HXDI), trimethylhexamethylene diisocyanate (TMDI), etc.

Among these, for applications for which weather resistance is required, it is preferable to use hexamethylene diisocyanate (HMDI) having a linear molecular structure. For applications for which surface hardness is required, it is preferable to use isophorone diisocyanate (IPDI). Furthermore, it is also effective to use a mixture of hexamethylene diisocyanate (HMDI) and isophorone diisocyanate (IPDI) in order to combine their advantages. In addition, in order to improve surface hardness, it is preferable to use a resin that can be cured by active energy rays, such as ultraviolet rays or electron rays. These resins can be used in combination with each other.

Furthermore, in order to impart various functions, for example, functional additives, such as an antimicrobial agent and an antifungal agent, may be added to the first and second gloss-adjusting layers 5 and 6. Moreover, an ultraviolet absorber and a light stabilizer may be added, if necessary. Usable examples of ultraviolet absorbers include benzotriazole-based ultraviolet absorbers, benzoate-based ultraviolet absorbers, benzophenone-based ultraviolet absorbers, and triazine-based ultraviolet absorbers. Moreover, usable examples of light stabilizers include hindered amine-based light stabilizers. Furthermore, when contamination control performance and Sellotape (registered trademark) mold-release characteristics are required, a release agent having a silicone skeleton can be added. In this case, the type of release agent is not limited; however, the use of a silicone release agent having an end functional group that is reactive with the resin composition can improve contamination control performance and the durability of Sellotape mold-release characteristics.

In the present embodiment, the first and second gloss-adjusting layers 5 and 6 have different glosses. Moreover, the first gloss-adjusting layer 5 covers the entire surface of the substrate 2 on the first gloss-adjusting layer 5 side, and the second gloss-adjusting layer 6 partially covers the surface of the first gloss-adjusting layer 5 on the second gloss-adjusting layer 6 side. Unevenness is expressed by the difference in gloss between the first and second gloss-adjusting layers 5 and 6.

The present embodiment shows an example in which the first gloss-adjusting layer 5 covers the entire surface of the substrate 2 on the first gloss-adjusting layer 5 side; however, other structures may also be employed. For example, the first gloss-adjusting layer 5 may be configured to partially cover the surface of the substrate 2 on the first gloss-adjusting layer 5 side.

Moreover, a matting agent is added to, of the first and second gloss-adjusting layers 5 and 6, one with lower gloss. The amount of the matting agent added is preferably 5 parts by mass or more and 40 parts by mass or less relative to 100 parts by mass of the resin composition. The amount of the matting agent added is more preferably 10 parts by mass or more and 30 parts by mass or less. If the amount of the matting agent is less than 5 parts by mass, the matting effect is insufficient; thus, the gloss difference from the gloss-adjusting layer with higher gloss is reduced, so that the feeling of unevenness is insufficient. In contrast, if the amount of the matting agent is larger than 40 parts by mass, the resin composition is relatively insufficient with respect to the matting agent, thereby resulting in the removal of the matting agent, and reduction in scratch resistance due to the removal of the matting agent, so that the durability required for the decorative material 1 is severely impaired.

It is also possible to add any matting agent to the gloss-adjusting layer with higher gloss. These should be suitably adjusted according to the final feeling of unevenness and designability. The matting agent and the resin composition used in the first and second gloss-adjusting layers 5 and 6 may be the same or different. These can be freely selected depending on the feeling of unevenness and various characteristics demanded.

The thickness of the first and second gloss-adjusting layers 5 and 6 may be any numerical value; however, because the particle diameter of the matting agent is preferably 2 μm or more and 15 μm or less, as described above, the thickness of the first and second gloss-adjusting layers 5 and 6 is preferably within an equivalent range, and more preferably 1.8 μm or more and 13.6 μm or less. Moreover, the first and second gloss-adjusting layers 5 and 6 are layers on the outermost surface of the decorative material 1, and are thus required to have surface physical properties, such as abrasion resistance, scratch resistance, solvent resistance, and contamination resistance, which are required for the decorative material 1. Of these properties, abrasion resistance and scratch resistance are influenced by the layer thickness, and a higher layer thickness is advantageous. Therefore, the thickness of the first and second gloss-adjusting layers 5 and 6 is more preferably 2 μm or more and 12 μm or less. If the layer thickness is less than 1.8 μm, abrasion resistance and scratch resistance are significantly reduced; thus, the use as the decorative material 1 may be limited. In contrast, if the layer thickness is larger than 13.6 μm, the flexibility of the first and second gloss-adjusting layers 5 and 6 themselves is reduced; thus, the processability as the decorative material 1 may be deteriorated.

The substrate 2 is not limited, as long as it is usable as base paper for the decorative material 1. Examples thereof include paper, such as tissue paper, resin-mixed paper, titanium paper, resin-impregnated paper, flame-resistant paper, and inorganic paper; woven fabrics or non-woven fabrics made of natural fibers or synthetic fibers; synthetic resin-based substrates comprising homo or random polypropylene resins, polyolefin resins such as polyethylene resin, copolymerized polyester resins, crystalline polyester resins in an amorphous state, polyethylene naphthalate resins, polybutylene resins, acrylic resins, polyamide resins, polycarbonate resins, polyvinyl chloride resins, polyvinylidene chloride resins, fluororesins, etc.; wooden substrates, such as wood veneer, sliced veneer, plywood, laminate lumber, particle board, and medium density fiberboard; inorganic substrates, such as gypsum plates, cement plates, calcium silicate plates, and pottery plates; metal-based substrates, such as iron, copper, aluminum, and stainless steel; composite materials and laminates thereof; and other conventionally known materials. Moreover, the shape of the substrate 2 can be, for example, a film shape, a sheet shape, a plate shape, a profile molded article, or the like.

A pattern ink layer 4 for adding a design pattern to the decorative material 1 can be formed between the substrate 2 and the first gloss-adjusting layers 5. Usable examples of the design pattern include wood grain patterns, grain patterns, sand patterns, tiling patterns, brick patterns, fabric patterns, grain leather patterns, geometric patterns, and the like. In the example of FIG. 1, the pattern ink layer 4 is formed in a portion directly below the second gloss-adjusting layer 6. In other words, the second gloss-adjusting layer 6 is formed only in a portion overlapping the pattern ink layer 4. Moreover, the design pattern of the pattern ink layer 4 is synchronized with the gloss of the second gloss-adjusting layer 6. The designability due to the second gloss-adjusting layer 6 can be thereby added to the designability due to the pattern ink layer 4. Therefore, it is possible to form a decorative material 1 having a high-grade design expression close to natural wood or natural stone.

The present embodiment shows an example in which the second gloss-adjusting layer 6 is formed only in a portion overlapping the pattern ink layer 4, that is, the second gloss-adjusting layer 6 is formed only in a portion directly above the pattern ink layer 4; however, other structures can also be employed. For example, the second gloss-adjusting layer 6 may be formed in a portion overlapping the pattern ink layer 4; in addition to the portion directly above the pattern ink layer 4, the second gloss-adjusting layer 6 may be formed in partial portions other than the right above portion.

Furthermore, a base ink layer 3, which covers the entire surface of the substrate 2 on the first gloss-adjusting layer 5 side, may be formed between the substrate 2 and the pattern ink layer 4, depending on the desired design. Moreover, the base ink layer 3 may be a multilayer of two or more layers, if necessary, to achieve masking properties etc. Furthermore, the pattern ink layer 4 may be formed by laminating as many layers as necessary for expression of the desired design. Thus, the pattern ink layer 4 and the base ink layer 3 can be combined in various ways depending on the desired design, i.e., design to be expressed; however, they are not limited.

The constituent materials of the base ink layer 3 and the pattern ink layer 4 are not limited. For example, printing ink in which a matrix and a coloring agent, such as dye or pigment, are dissolved and dispersed in a solvent, or a coating agent, can be used. Examples of the matrix include various synthetic resins, such as oily nitrocellulose resin, two-component urethane resin, acrylic-based resin, styrene-based resin, polyester-based resin, urethane-based resin, polyvinyl-based resin, alkyd resin, epoxy-based resin, melamine-based resin, fluororesin, silicone-based resin, and rubber-based resin; mixtures thereof, copolymers thereof, etc. Further, examples of the coloring agent include inorganic pigments, such as carbon black, titanium white, zinc white, rouge, chrome yellow, Prussian blue, and cadmium red; organic pigments, such as azo pigments, lake pigments, anthraquinone pigments, phthalocyanine pigments, isoindolinone pigments, and dioxazine pigments; and mixtures thereof. Moreover, usable examples of the solvent include toluene, xylene, ethyl acetate, butyl acetate, methyl alcohol, ethyl alcohol, isopropyl alcohol, acetone, methyl ethyl ketone, methyl isobutyl ketone, cyclohexanone, water, and mixtures thereof.

Further, in order to impart various functions, for example, functional additives, such as an extender pigment, a plasticizer, a dispersant, a surfactant, a tackifier, an adhesive aid, a drying agent, a curing agent, a curing accelerator, and a curing retarder, may be added to the base ink layer 3 and the pattern ink layer 4.

Each of the base ink layer 3, the pattern ink layer 4, and the first and second gloss-adjusting layers 5 and 6 can be formed, for example, by various printing methods, such as a gravure printing method, an offset printing method, a screen printing method, an electrostatic printing method, and an ink-jet printing method. Moreover, because the base ink layer 3 and the first gloss-adjusting layer 5 cover the entire surface of the substrate 2 on the first gloss-adjusting layer 5 side, they can be formed, for example, by various coating methods, such as a roll coating method, a knife coating method, a microgravure coating method, and a die coating method. These printing methods and coating methods may be selected separately depending on the layer to be formed, or the same method may be selected to carry out combined processing.

In order to adjust the thickness of the first and the second gloss-adjusting layers 5 and 6, the coating amount may be adjusted in the above printing methods and coating methods. The coating amount can be calculated by producing a product in which a gloss-adjusting layer is formed on the substrate 2, and a product in which a gloss-adjusting layer is not formed in the various printing methods and coating methods, and determining the coating amount from their mass difference. The relationship between coating amount and thickness can be determined by cross-sectional observation.

In particular, when abrasion resistance is required, a transparent resin layer (not shown) can be provided between the pattern ink layer 4 and the first gloss-adjusting layer 5. As the transparent resin layer, for example, a resin composition comprising an olefin-based resin as a main component is preferably used. Examples of the olefin-based resin include polypropylene, polyethylene, and polybutene; as well as those obtained by homopolymerization or copolymerization of two or more α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene); and those obtained by copolymerization of ethylene or α-olefins with other monomers, such as an ethylene-vinyl acetate copolymer, an ethylene-vinyl alcohol copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, and an ethylene-butyl acrylate copolymer. In particular, in order to further improve surface strength, highly crystalline polypropylene is preferably used.

Furthermore, the transparent resin layer may contain, for example, additives, such as a heat stabilizer, an ultraviolet absorber, a light stabilizer, an antiblocking agent, a catalyst scavenger, and a coloring agent. These additives can be suitably selected from known additives. Moreover, the transparent resin layer can be formed, for example, by various lamination methods, such as a method using thermal pressure, an extrusion lamination method, and a dry lamination method.

(Effects and Others)

(1) As described above, in the decorative material 1 of the present embodiment, a matting agent is added to, of the first gloss-adjusting layer 5 and the second gloss-adjusting layer 6, one with lower gloss, where the matting agent has a particle diameter of 1.0 times or more, and more preferably 1.1 times or more, the thickness of the gloss-adjusting layer with lower gloss. Accordingly, sufficient unevenness can be imparted to the surface of the gloss-adjusting layer; thus, glossiness does not increase in oblique observation, and low gloss can be maintained. Therefore, it is possible to provide a decorative material 1 having a feeling of unevenness obtained by the difference in gloss that hardly changes even when observed obliquely.

(2) Moreover, in the decorative material 1 of the present embodiment, the design pattern of the pattern ink layer 4 is synchronized with the gloss of the second gloss-adjusting layer 6; thus, the designability due to the second gloss-adjusting layer 6 can be added to the designability due to the pattern ink layer 4, so that a decorative material 1 having a high-grade design expression close to natural wood or natural stone can be formed.

(3) Furthermore, in the decorative material 1 of the present embodiment, a matting agent comprising an inorganic material having a high matting effect is used. Therefore, the gloss of the gloss-adjusting layer to which the matting agent is added can be significantly reduced. Accordingly, the difference between the gloss of the first gloss-adjusting layer 5 and the gloss of the second gloss-adjusting layer 6 can be increased, and the feeling of unevenness obtained can be enhanced. An excellent design expression of greater depth can be thereby achieved.

(4) Furthermore, in the decorative material 1 of the present embodiment, the matting agent is added in an amount of 5 parts by mass or more and 40 parts by mass or less relative to 100 parts by mass of a resin composition that constitutes the gloss-adjusting layer with lower gloss. Accordingly, sufficient unevenness can be reliably imparted to the surface of the gloss-adjusting layer; thus, glossiness does not increase in oblique observation, and low gloss can be reliably maintained. Therefore, it is possible to reliably provide a decorative material 1 having a feeling of unevenness obtained by the difference in gloss that hardly changes even when observed obliquely.

(5) Furthermore, in the decorative material 1 of the present embodiment, the matting agent is also added to the gloss-adjusting layer with higher gloss. Even in such an embodiment, sufficient unevenness can be imparted to the surface of the gloss-adjusting layer; thus, glossiness does not increase in oblique observation, and low gloss can be maintained. Therefore, it is possible to provide a decorative material 1 having a feeling of unevenness obtained by the difference in gloss that hardly changes even when observed obliquely.

(6) Furthermore, in the decorative material 1 of the present embodiment, the particle diameter of the matting agent is 2 μm or more and 15 μm or less. Therefore, a feeling of unevenness on the surface of the gloss-adjusting layer can be sufficiently obtained.

(7) Furthermore, in the decorative material 1 of the present embodiment, the particle diameter of the matting agent is 3.0 or less times the thickness of the gloss-adjusting layer with lower gloss. Accordingly, the removal of the matting agent can be suppressed; thus, it is possible to provide a decorative material 1 having excellent abrasion resistance and scratch resistance, as well as excellent contaminant component-wiping properties.

(Modification)

Figure 2:
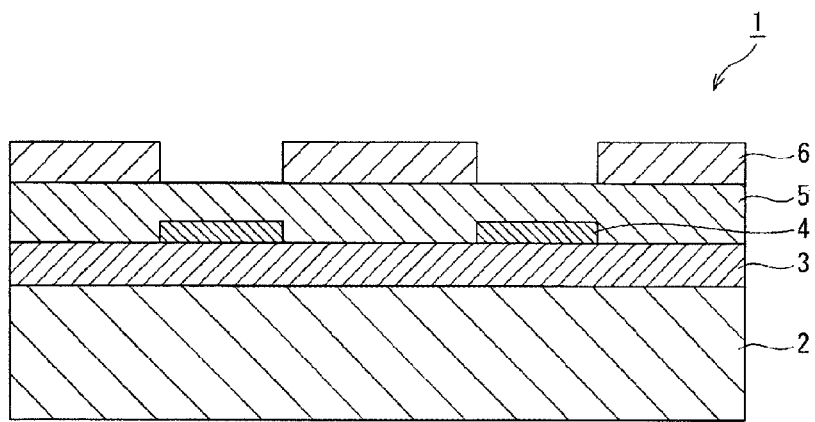
FIG. 2 is a cross-sectional view showing a modification of the decorative material.

The present embodiment shows an example in which the second gloss-adjusting layer 6 is formed in a portion overlapping the pattern ink layer 4, and the design pattern of the pattern ink layer 4 is synchronized with the gloss of the second gloss-adjusting layer 6; however, other structures can also be employed. For example, as shown in FIG. 2, the second gloss-adjusting layer 6 may be formed in a portion other than directly above the pattern ink layer 4, and the design pattern of the pattern ink layer 4 may be synchronized with the gloss of the first gloss-adjusting layer 5. The gloss of the exposed first gloss-adjusting layer 5 is thereby imparted to the design pattern of the pattern ink layer 4, so that the designability due to the first gloss-adjusting layer 5 can be added to the designability due to the pattern ink layer 4. Therefore, it is possible to form a decorative material 1 having a high-grade design expression close to natural wood or natural stone.

Specific Examples of the decorative material 1 according to the present embodiment are described below.

Example 1

In Example 1, impregnated paper having a basis weight of 50 g/m² (GFR-506, produced by Kohjin Co., Ltd.) was used as a substrate 2. Then, a base ink layer 3 and a pattern ink layer 4 were formed in this order on one side of the substrate 2 using oily nitrocellulose resin gravure printing ink (each color of PCNT (PCRNT), produced by Toyo Ink Co., Ltd.). The design pattern of the pattern ink layer 4 was a wood grain pattern.

Subsequently, ink for a first gloss-adjusting layer 5 was applied to the substrate 2, on which the pattern ink layer 4 was formed, so as to cover the entire surface of one side of the substrate 2, thereby forming the first gloss-adjusting layer 5. The ink was composed of 8 parts by mass of silica-based matting agent (Mizukasil 310P, produced by Fuji Silysia Chemical Ltd.) and 10 parts by mass of polyisocyanate (UR190B curing agent, produced by Toyo Ink Co., Ltd.) relative to 100 parts by mass of acrylic polyol (6KW-700, produced by Taisei Fine Chemical Co., Ltd.). The coating amount of the ink was 2.5 g/m². The thickness obtained by cross-sectional observation was 2.1 µm. The average particle diameter of the silica-based matting agent was 2.7 µm. Next, ink for a second gloss-adjusting layer 6 was applied to a portion of the first gloss-adjusting layer 5 directly above the pattern ink layer 4, thereby forming the second gloss-adjusting layer 6. The ink was composed of 3 parts by mass of silica-based matting agent (Mizukasil 310P, produced by Fuji Silysia Chemical Ltd.) and 10 parts by mass of polyisocyanate (UR190B curing agent, produced by Toyo Ink Co., Ltd.) relative to 100 parts by mass of acrylic polyol (6KW-700, produced by Taisei Fine Chemical Co., Ltd.). The average particle diameter of the silica-based matting agent was 2.7 µm.

Example 2

In Example 2, ink for a first gloss-adjusting layer 5 was applied to a substrate 2, on which a pattern ink layer 4 was formed, so as to cover the entire surface of one side of the substrate 2, thereby forming the first gloss-adjusting layer 5. The ink was composed of 8 parts by mass of silica-based matting agent (ACEMATT OK900, produced by Evonik Japan Co., Ltd.) and 10 parts by mass of polyisocyanate (UR190B curing agent, produced by Toyo Ink Co., Ltd.) relative to 100 parts by mass of acrylic polyol (6KW-700, produced by Taisei Fine Chemical Co., Ltd.). The average particle diameter of the silica-based matting agent was 7.5 µm. Moreover, the coating amount of the ink was 7 g/m². The thickness obtained by cross-sectional observation was 6.5 µm. Next, ink for a second gloss-adjusting layer 6 was applied to only a portion of the first gloss-adjusting layer 5 directly above the pattern ink layer 4, thereby forming the second gloss-adjusting layer 6. The ink was composed of 3 parts by mass of silica-based matting agent having an average particle diameter of 7.5 µm (ACEMATT OK900, produced by Evonik Japan Co., Ltd.) and 10 parts by mass of polyisocyanate (UR190B curing agent, produced by Toyo Ink Co., Ltd.) relative to 100 parts by mass of acrylic polyol (6KW-700, produced by Taisei Fine Chemical Co., Ltd.). Other configurations were the same as those of Example 1.

Example 3

In Example 3, ink for a first gloss-adjusting layer 5 was applied to a substrate 2, on which a pattern ink layer 4 was formed, so as to cover the entire surface of one side of the substrate 2, thereby forming the first gloss-adjusting layer 5. The ink was composed of 8 parts by mass of silica-based matting agent (ACEMATT 810, produced by Evonik Japan Co., Ltd.) and 10 parts by mass of polyisocyanate (UR190B curing agent, produced by Toyo Ink Co., Ltd.) relative to 100 parts by mass of acrylic polyol (6KW-700, produced by Taisei Fine Chemical Co., Ltd.). The average particle diameter of the silica-based matting agent was 10.5 µm. Moreover, the coating amount of the ink was 9.5 g/m². The thickness obtained by cross-sectional observation was 9.3 µm. Next, ink for a second gloss-adjusting layer 6 was applied to only a portion of the first gloss-adjusting layer 5 directly above the pattern ink layer 4, thereby forming the second gloss-adjusting layer 6. The ink was composed of 3 parts by mass of silica-based matting agent having an average particle diameter of 10.5 µm (ACEMATT 810, produced by Evonik Japan Co., Ltd.) and 10 parts by mass of polyisocyanate (UR190B curing agent, produced by Toyo Ink Co., Ltd.) relative to 100 parts by mass of acrylic polyol (6KW-700, produced by Taisei Fine Chemical Co., Ltd.). Other configurations were the same as those of Example 1.

Comparative Example 1

In Comparative Example 1, ink for a first gloss-adjusting layer 5 of the same composition as that of Example 1 was applied to a substrate 2, on which a pattern ink layer 4 was formed, in a coating amount of 3.5 g/m² so as to cover the entire surface of one side of the substrate 2. Except for the above, a first gloss-adjusting layer 5 and a second gloss-adjusting layer 6 were formed in the same manner as in Example 1, thereby obtaining a decorative material 1. In this case, the thickness of the first gloss-adjusting layer 5 obtained by cross-sectional observation was 3.3 µm.

Comparative Example 2

In Comparative Example 2, ink for a first gloss-adjusting layer 5 of the same composition as that of Example 2 was applied to a substrate 2, on which a pattern ink layer 4 was formed, in a coating amount of 8.5 g/m² so as to cover the entire surface of one side of the substrate 2. Except for the above, a first gloss-adjusting layer 5 and a second gloss-adjusting layer 6 were formed in the same manner as in Example 2, thereby obtaining a decorative material 1. In this case, the thickness of the first gloss-adjusting layer 5 obtained by cross-sectional observation was 8.4 µm.

Comparative Example 3

In Comparative Example 3, ink for a first gloss-adjusting layer 5 of the same composition as that of Example 3 was applied to a substrate 2, on which a pattern ink layer 4 was formed, in a coating amount of 11.5 g/m² so as to cover the entire surface of one side of the substrate 2. Except for the above, a first gloss-adjusting layer 5 and a second gloss-adjusting layer 6 were formed in the same manner as in Example 3, thereby obtaining a decorative material 1. In this case, the thickness of the first gloss-adjusting layer 5 obtained by cross-sectional observation was 11.2 µm.

<Evaluation>

Examples 1 to 3 and Comparative Examples 1 to 3 above were evaluated for designability and glossiness.

<Designability>

The designability of each decorative material 1 was observed from the front and obliquely. When a feeling of unevenness was recognized from various angles, this case was evaluated as "++"; when a feeling of unevenness was reduced in oblique observation, this case was evaluated as "+"; and when a feeling of unevenness was not recognized in oblique observation, this case was evaluated as "−."

<Glossiness>

The glossiness at 20°, 60°, and 85° was measured in the first gloss-adjusting layer 5, i.e., the gloss-adjusting layer with lower gloss.

Table 1 shows these evaluation results.

TABLE 1

| Item | Designability | Glossiness | | |
|---|---|---|---|---|
| | | 20° | 60° | 85° |
| Example 1 | ++ | 0.5 | 1.0 | 1.8 |
| Example 2 | ++ | 0.5 | 0.9 | 1.6 |
| Example 3 | ++ | 0.6 | 0.9 | 1.5 |
| Comparative Example 1 | − | 0.5 | 1.2 | 9.8 |
| Comparative Example 2 | − | 0.5 | 1.1 | 9.4 |
| Comparative Example 3 | + | 0.6 | 1.0 | 7.0 |

It is found that in the decorative materials 1 of Examples 1 to 3, a feeling of unevenness is maintained even when they are observed obliquely, as shown in Table 1. On the other hand, in the decorative materials 1 of Comparative Examples 1 to 3, a feeling of unevenness is reduced or not recognized when they are observed obliquely. This tendency also appears in the measurement results of glossiness. It is considered that in Comparative Examples 1 to 3, the glossiness (gloss) at 85°, which corresponded to oblique observation, increased, and that the difference between the glossiness (gloss) of the first gloss-adjusting layer 5 and the glossiness (gloss) of the second gloss-adjusting layer 6 was reduced, so that the feeling of unevenness obtained by the difference in gloss was reduced.

The above results revealed that the decorative materials 1 of Examples 1 to 3 had excellent design in which a feeling of unevenness obtained by the difference in gloss was constant even when observed from various angles.

The decorative material of the present invention is not limited to the above embodiments and Examples, and various modifications can be made within a range that does not impair the features of the invention.

REFERENCE SIGNS LIST

1 . . . Decorative material; 2 . . . Substrate; 3 . . . Base ink layer; 4 . . . Pattern ink layer; 5 . . . First gloss-adjusting layer; 6 . . . Second gloss-adjusting layer.

What is claimed is:

1. A decorative material comprising: a first gloss-adjusting layer provided on a substrate, and a second gloss-adjusting layer partially provided on the first gloss-adjusting layer, and having gloss that is different from that of the first gloss-adjusting layer; wherein a matting agent is added to, of the first gloss-adjusting layer and the second gloss-adjusting layer, one with lower gloss, where the matting agent is a silica mating agent having a particle diameter of 1.1 times and 1.3 times a thickness of the gloss-adjusting layer with lower gloss, wherein the particle diameter of the silica mating agent is from 2 μm to 12 μm; wherein an amount of the silica mating agent in the gloss-adjusting layer with lower gloss is from 5 parts by mass to 30 parts to 100 parts of a resin composition that constitutes the gloss-adjusting layer with lower gloss; wherein the matting agent is also added to the gloss-adjusting layer with higher gloss; wherein an amount of the mating agent in the gloss-adjusting layer with higher gloss is about 3 mass parts per 100 parts of a resin composition of a resin composition that constitutes the gloss-adjusting layer with higher gloss, wherein the amount of the silica mating agent in the gloss-adjusting layer with lower gloss is from 5 parts by mass to 10 parts to 100 parts of the resin composition that constitutes the gloss-adjusting layer with lower gloss and wherein an 85° glossiness of the decorative material is 1.8 or less.

2. The decorative material of claim 1, wherein the decorative material further comprises a pattern ink layer provided between the substrate and the first gloss-adjusting layer; the second gloss-adjusting layer is formed in a portion overlapping the pattern ink layer; and a design pattern of the pattern ink layer is synchronized with the gloss of the second gloss-adjusting layer.

3. The decorative material of claim 1, wherein the decorative material further comprises a pattern ink layer provided between the substrate and the first gloss-adjusting layer; the first gloss-adjusting layer entirely covers a surface of the substrate on a first gloss-adjusting layer side; the second gloss-adjusting layer is formed in a portion other than a portion directly above the pattern ink layer; and the design pattern of the pattern ink layer is synchronized with the gloss of the first gloss-adjusting layer.

4. The decorative material of claim 1, wherein the first gloss-adjusting layer is the gloss-adjusting layer with the lower gloss.

5. The decorative material of claim 1, wherein the first gloss-adjusting layer is the gloss-adjusting layer with the lower gloss.

* * * * *